United States Patent
Chefalas et al.

(10) Patent No.: US 7,099,656 B2
(45) Date of Patent: Aug. 29, 2006

(54) INTEGRATED CALENDAR AND PHONEMAIL SYSTEM

(75) Inventors: Thomas E. Chefalas, Somers, NY (US); Alexei A. Karve, Mohegan Lake, NY (US); Steve Mastrianni, Unionville, CT (US); Ajay Mohindra, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 10/116,277

(22) Filed: Apr. 3, 2002

(65) Prior Publication Data

US 2003/0190019 A1    Oct. 9, 2003

(51) Int. Cl.
*H04B 7/20* (2006.01)

(52) U.S. Cl. ............... 455/412.1; 455/418; 455/556.1; 455/557; 379/88.22

(58) Field of Classification Search ............ 455/412.1, 455/2, 413, 414.1–4, 418, 419, 556.1–2, 455/557; 707/10; 379/88.22
See application file for complete search history.

(56) References Cited

U.S. PATENT DOCUMENTS 5,870,549 A * 2/1999 Bobo, II .................. 709/206
6,058,415 A * 5/2000 Polcyn ..................... 379/90.01
6,580,787 B1 * 6/2003 Akhteruzzaman et al. ..................... 379/88.22
2002/0123331 A1 * 9/2002 Lehaff et al. ............ 455/414.1
2003/0097361 A1 * 5/2003 Huang et al. ................ 707/10

FOREIGN PATENT DOCUMENTS

| JP | 60-173967 | 9/1985 |
| JP | 11-161706 | 6/1999 |
| JP | 2000-132603 | 5/2000 |
| JP | 2001-297023 | 10/2001 |

* cited by examiner

*Primary Examiner*—Matthew Anderson
*Assistant Examiner*—Philip J. Sobutka
(74) *Attorney, Agent, or Firm*—Lisa M. Yamonaco; Harrington & Smith, LLP

(57) ABSTRACT

An integrated calendar-phone mail system accepts input from a workstation to a calendar or to a voice-mail program periodically updating the phone mail data with new data from the calendar and updating the calendar data with new data from the phone mail.

36 Claims, 4 Drawing Sheets

INTEGRATED CALENDAR AND PHONEMAIL SYSTEM

FIELD OF THE INVENTION

The field of the invention is that of computerized calendar systems for storing and displaying meetings and other calendar functions.

BACKGROUND OF THE INVENTION

In contemporary practice in office administration, even quite small entities (for-profit and non-profit) operate computerized calendar systems and phone-mail systems. A user will enter his (his or her being understood) appointments, meetings, time out of the office for personal matters such as vacation and doctor's appointments, etc. in his calendar. Other employees will be able to view the data in the calendar to find times when all of a group of people can attend a meeting. Meeting notices can be entered in the calendar selectively (when issued by co-workers) or automatically (e.g. when issued by management).

Telephone systems have recording facilities that permit a caller to leave a message on the computer that controls the telephone system (the computer can be located in an individual handset or in a "PBX" system).

It happens quite often that a calendar and phone-mail system will not be kept up to date; e.g. the phone-mail message states that someone is out of the office for weeks after he returns.

It would be advantageous for users of such systems if the data bases were automatically updated and reconciled to contain the same information.

SUMMARY OF THE INVENTION

The invention relates to a calendar system that accepts input from both computer keyboards and from telephones.

A feature of the invention is the conversion of calendar data to audio signals expressing spoken words.

Another feature of the invention is the conversion of touch-tone or audio signals from a telephone to data in a computerized calendar.

Yet another feature of the invention is periodic replication of data between a computer operating a calendar software program and a computer operating a voice-mail program.

BEST MODE OF CARRYING OUT THE INVENTION

Figure 1:
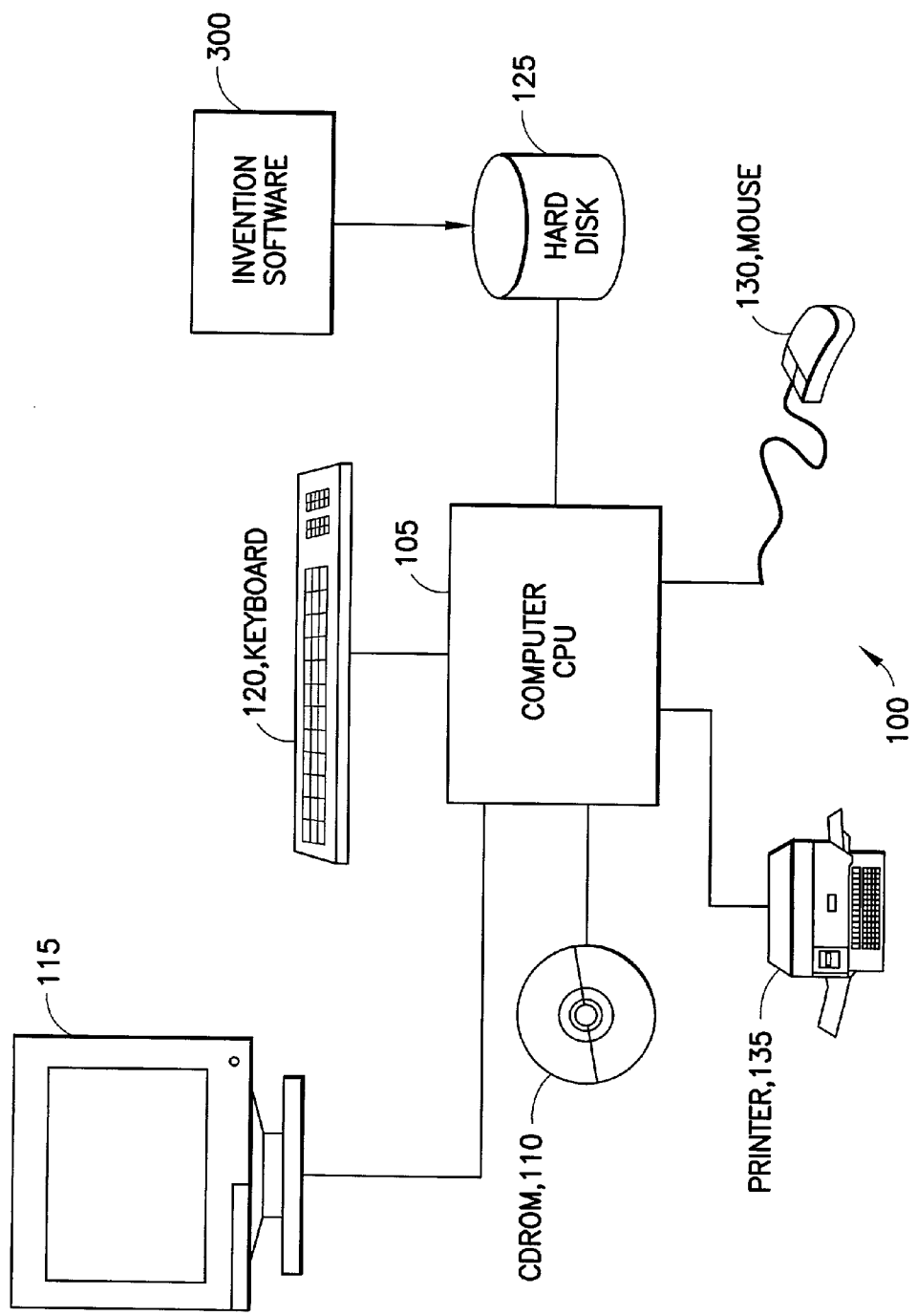
FIG. 1 illustrates several components in a computer workstation.

FIG. 1 illustrates schematically the components of a typical workstation 100, comprising computer CPU 105, CDROM 110, often used for storing computer programs or large amounts of data, CRT display 115, keyboard 120, hard disk 125, mouse 130 and printer 135. Box 300 represents software according to the invention for carrying out various operations involved in maintaining the calendar database and the phonemail database.

Figure 2:
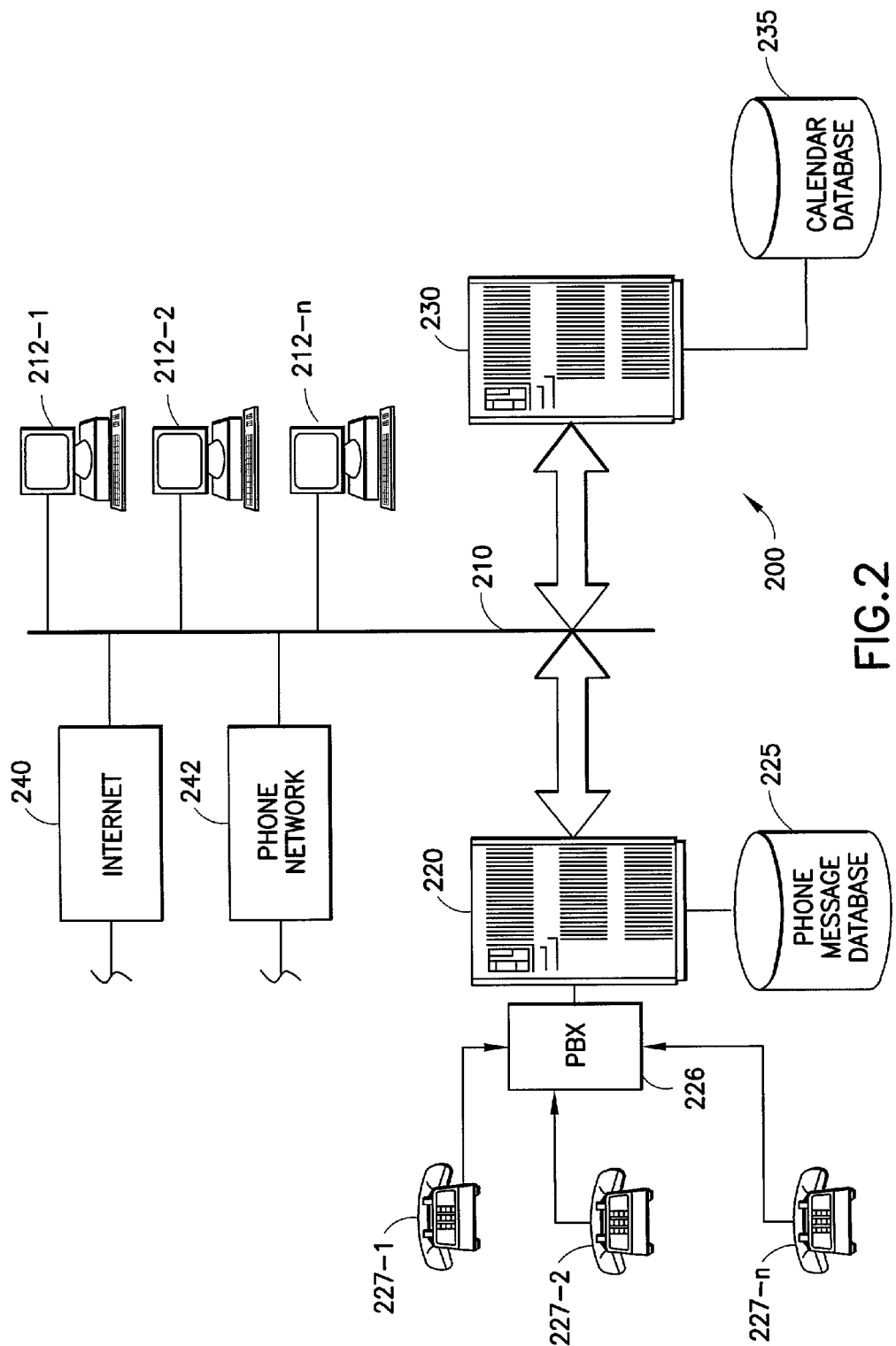
FIG. 2 illustrates various components of a contemporary office computer network.

Referring now to FIG. 2, there is shown schematically an office system 200 incorporating a set of terminals 212-*i* similar to that shown in FIG. 1, that are connected to connection means 210 that links the various network components (e.g. a cable or set of RF transmitters and receivers). A calendar server 230 contains the software to perform functions according to the invention. The data are shown schematically as residing on disk 235. Similarly, phone server 220 operates the phone mail system, communicating with PBX 226 and database 225. A set of telephone handsets 227-*i* are connected to PBX 226. Distant phones (including cell phones) communicate through the telephone network, represented schematically by box 242. Box 246 represents connections to the internet or other (internal or external) networks.

In operation, a user will access his calendar, typically clicking on an icon with his mouse. A screen appears that gives him a set of choices. In this example, the operation is that of making a calendar entry. The term "updating" will be used generically both for entering a new meeting or other entry and also for changing a parameter in an existing entry. The display 115 will conventionally show the data (update calendar data) as they are entered. The term "display request" will be used to refer generally to an operation such as clicking on an icon or a dialog box on the display to call up a representation of the data. Similarly, the term "play request" will be used to refer generally to pressing an indicated numeral on the handset or otherwise signalling to the phone server to play data (in audio form).

Periodically, the two servers 220 and 230 will "replicate", meaning that they will transfer data, so that both databases contain the same information. Continuing with the example of calendar data entered from the keyboard, server 230 will survey the calendar database for that particular user, extract updated data, convert the updated data to a representation that is acceptable to the software on phone server 220 and transmit it to server 220. Server 220 then illustratively generates (either generates on the fly or generates and stores) converted phone (audio) data that is played in the handset in response to a play request.

As one possible method, server 230 may extract the data "meeting in conference room 120 at 1pm monday, the 15th" from the calendar database. That data are then converted illustratively by means of a lookup table and sent as corresponding data—the phrases "meeting" and "in conference room" having been recorded and digitized previously. The code in the calendar database representing the word 'meeting' is recognized by server 230 (or by server 220) and corresponding data are sent to server 220. The term "corresponding data" is used broadly to mean any of: (a) the same data; (b) a translation of the data that is in a format acceptable to the software in server 220; (c) the tone signals that go to the handset; etc. At the appropriate time, the data that produce the correct sounds are sent to the handset (e.g. some PBX systems will have digital to analog conversion means in the handset, while others need to have the conversion done elsewhere, such as in server 220). Other words, such as "conference", "salary review", or "exit interview" may be added at the discretion of the designer of the system. The same process is applied to the phrase "in conference room" or "my office", etc. Other words or numbers may be stored in the same fashion, or may be generated "on the fly" in a conventional speech synthesis system. Regardless of the conversion method, the data sent to the handset will be referred to as "converted phone data", meaning data converted from the format used in server 230 to data that produce the correct sound in the handset. The conversion process may take place totally in one server, partially in one and partially in the other, partially in the handset, etc. as is convenient in contemporary technology.

Data may flow in the reverse direction, and a user in a remote location may update his calendar through the phone. For example, a missed flight may require cancellation of a meeting that the user had called. In that case, the user would illustratively enter a set of numbers (or letters, * and/or #) that represent a meeting, the time and cancellation. In the example given, the user could enter * to indicate a switch from voicemail mode to calendar mode, 1 to indicate a switch to playback mode for reviewing the calendar and **2 to indicate a switch to update mode and that a change will be transmitted; e.g. *1* to indicate that the next two digits are the day of the month, *2* to indicate that the next four digits are the time of the meeting in a twenty-four hour clock, or #0# to indicate that the identified meeting is cancelled. Those skilled in the art will readily be able to devise other sets of codes. The data may be sent, as indicated above, after a flagging signal (referred to as command mode) or, following practice in many phonemail systems, in response to a prompt: (e.g. "If you wish to play a list of meetings, press 1, then the day of the month; if you wish to change an existing meeting, press 2; if you wish to enter a new meeting, press 3."), etc, referred to as prompt mode.

The user may also enter calendar data audibly—for example, by speaking the words "New meeting, March fifteenth, 2pm, at my office, subject spring plan". In that case, server 220 contains voice recognition software that the user has "trained" to recognize a limited set of phrases associated with calendar functions. Preferably, the sequence of terms is fixed, in order to facilitate the voice recognition process. In this limited approach, the server will have a limited set of data, e.g. the days of the month and, at the point in the sequence when a date is to be spoken, will fit the spoken sounds into one of the entries on the list of days. The same applies to a list of times, functions and locations. The foregoing "limited" approach may be combined with general speech recognition, e.g. if there are too many possible meeting subjects, the computer could switch to "free-form" voice recognition and convert the spoken sounds as best it can.

A wholly free-form approach could be used for the voice recognition, but the structured approach is preferred in view of the limitations of current technology.

In principle, any amount of information can be transmitted by the keypad and/or the microphone of the handset, though the limitations of the device will restrict the amount that is practical to transmit.

Table I illustrates the typical operations—View Data, Input Data, Force Replication—that can be performed from various interface devices attached to or connected to the system.

TABLE I

Summary of Operating Modes
Local workstation, Remote Workstation or Phone

View or Play
    From Workstation
        Calendar Functions
        Phone messages—Display on screen # of messages, list of phone #s, names of message sources, play voicemail through workstation's speakers TABLE I-continued Summary of Operating Modes
Local workstation, Remote Workstation or Phone non-calendar data entered from phone
    From Phone
        Voicemail
        Calendar—play back recorded (or synthesized) list of meetings for selected day(s)
    Remote Workstation
        Contact Website maintained by Calendar Server
        Optionally contact Calendar Server directly
        (Subject to security restrictions)
Input
    Workstation—Calendar Functions
        Optionally, generate short messages to be put on voicemail
    Phone—Voicemail
        Enter Calendar Data through keypad
        Enter Calendar Data through microphone Force Replication
    Any Source—Initiates Replication Expanding on Table 1, the Viewing function at a workstation includes conventional calendar functions—viewing a schedule for a specified day, changing the schedule by entering new meetings, canceling meetings or changing the date, location or time of a meeting. In a system according to the invention, the user also has the option of viewing a list of phonemail messages with identifying indicia, including the number of the calling phone and the name assigned to that number. Thus, unwanted calls may often be discarded without taking the time to listen to them, simply on the basis of the source, such as telemarketers. Optionally, the user can play the phone messages through the workstation speakers, thus saving the time of entering the phonemail system and paging through various menus to reach the place in the menu tree where he is already.

From the Phone, the user can access standard voicemail functions and, in systems according to the invention, additionally play a listing of the meetings scheduled for a specified day and/or enter calendar data.

Users at a remote workstation may, in principle, perform any functions available from a workstation within the facility. Security considerations may limit the amount of information and functions that will be made available to remote users, but according to the invention in its broader forms, all workstation functions are available.

As another option, colleagues may enter data on the telephone that does not fit into the standard categories of phonemail or calendaring and have that data processed by the workstation. As an example, a sales team having a daily target amount of cold calls to make could make a daily report by calling up a telephone number and entering the number of calls, which would then be added with other numbers from other team members to generate a daily report. This data could be maintained as text or converted to voice through a speech synthesis program and played audibly through the workstation or through the phone.

Figure 3:
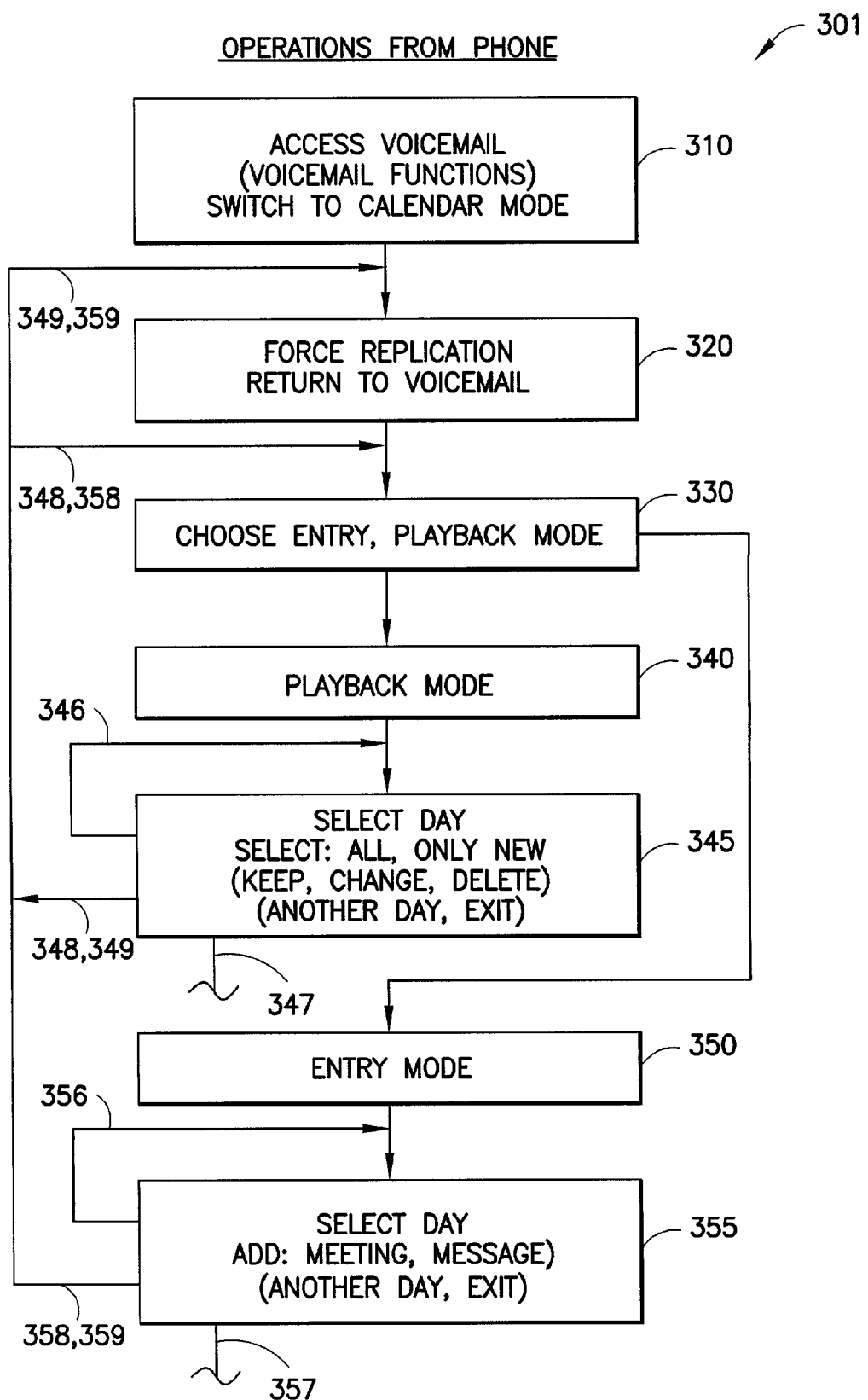
FIG. 3 illustrates in flow chart form the sequence of operations in updating a calendar from a phone.

Referring now to FIG. 3, there is shown an operating sequence in a portion 301 of the software 300 indicated schematically in FIG. 1. This example shows an illustrative sequence of operations in a telephone contact. In the first box, 310, the user may access the voicemail program, using any of the voicemail functions provided in that program. At his option, the user may switch to Calendar Mode (go to box 330), to use the calendar functions available according to the invention. Box 320 provides the options of forcing replication immediately, rather than waiting for the next scheduled operation or returning to the Voicemail program. Next, in box 330, the user is offered a choice between Entry or Playback Mode. Of course, the boxes and their contents in the Figure have been chosen for convenience in illustration and do not necessarily represent subroutines or other blocks of programming code. The functions may be performed by code arranged in various program structures, well known to those skilled in the art.

Playback Mode offers playback of meetings or other calendar events for a user-selected day. The user may also select to hear only new meetings and, additionally, may change or delete entries without taking the trouble to respond to prompts that will get him into Entry Mode through block 350. After processing the selected day, the user has an option to select another day (path 346) or to exit, in one of three modes. The user may exit the telephone function program (Voicemail program) on path 347, switch to Entry mode through path 348 to box 330 or return to the start of the calendar module through path 349 and box 320 (where the user has the options of forcing replication of the changes or of returning to the voicemail system and letting the system replicate on schedule.

If Entry Mode has been selected in Box 330, then the user is transferred to Box 350 and then to Box 355, where he has the options of adding a meeting or message for a selected day. The message may illustratively be a voicemail messages composed primarily of prerecorded passages announcing to attendees that a new meeting has been scheduled by the user in a certain location at a certain time. The user has the options of continuing with another day (path 356), returning to box 330 on path 358, returning to Box 320 on path 359 or exiting the program entirely on path 357.

Figure 4:
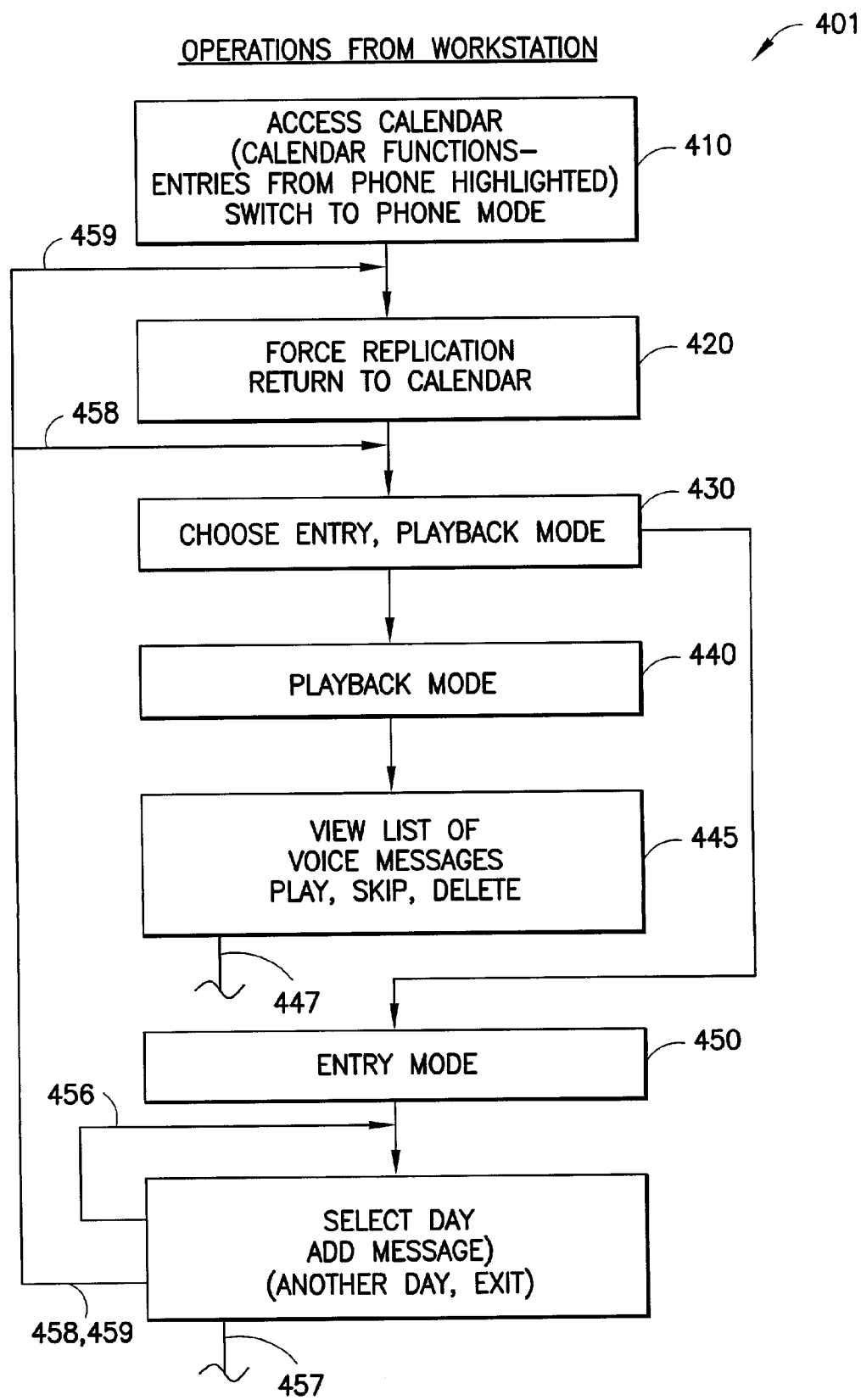
FIG. 4 illustrates in flow chart form the sequence of operations in viewing and updating phone entries.

Referring now to FIG. 4, there is shown a flow chart that is a counterpart to FIG. 3, showing another operating sequence in a portion 401 of the software 300 indicated schematically in FIG. 1. FIG. 4 is simpler than FIG. 3 because a system according to the invention automatically replicates calendar entries to the phone system. Conventional calendar functions have the functions of selecting days, setting up, changing and deleting meetings already built in. Presenting a list of proposed calendar entries that were received from the phone system for approval is within the invention in its broader scope, but not in the preferred embodiment because it is simpler to enter such meetings in the calendar with a flag, such as a different screen color, to alert the user that they are new. Such phone-derived meetings can be accepted or rejected using the ordinary calendar tools. Thus, boxes 410–440 are counterparts of the ones in FIG. 3. Box 445 presents an option that does not exist in the phone side of the system because a display screen can easily present an entire list simultaneously. A list of pending messages is displayed on the screen, together with the calling number and name. Unwanted messages can quickly be rejected. Optionally, the vocal contents of a message may be played through the workstation speakers. Exit is available through path 457.

The entry mode has another feature—generating a message that will be sent as a vocal voicemail message to one or more recipients. As one example, voicemail messages can be sent to attendees of a new meeting. Preferably, the contents of the message are selected from pull-down (or pop-up, etc) menus that call up prerecorded audio clips, thus facilitating message generation and, if professional announcers have recorded the clips, increasing comprehension compared with reaction to recordings from the average user.

Those skilled in the art will appreciate that the invention may be practiced with a combination of a program on a general purpose computer and a program controlling the PBX or individual handsets. If desired, the invention can be practiced through "patches" or modifications to an existing program, rather than through a newly written program. Optionally, if existing programs permit, the invention may be practiced through add-on or supplementary programs that are called by an existing program.

While the invention has been described in terms of a single preferred embodiment, those skilled in the art will recognize that the invention can be practiced in various versions within the spirit and scope of the following claims.

We claim:

1. A computer-implemented method of operating a calendar database in a computer, from which update calendar data are displayed in response to a display request from a user and of operating a phone mail database from which update phone data are played in response to a play request from a user, comprising the steps of:

entering update data in one of said calendar database and phone mail database;

converting update calendar data into converted phone data and entering said converted phone data into said phone mail database;

converting update phone data into converted calendar data and entering said converted calendar data into said calendar database, whereby said calendar database and said phone database both contain common data; and providing a user with a set of options including forcing replication of update data to the other of said calendar database and phone mail database and allowing replication of update data according to a schedule.

2. A method according to claim 1, in which the user enters update phone data in said phone database from the numeric keypad in a telephone handset, said update phone data being automatically replicated to said calendar database.

3. A method according to claim 1, in which the user enters update phone data in said phone database by speaking into a telephone handset, said update phone data being automatically replicated to said calendar database.

4. A method according to claim 1, in which the user enters update calendar data in said calendar database from a workstation, said update calendar data being automatically replicated to said phone database.

5. A method according to claim 2, in which the user enters update calendar data in said calendar database from a workstation, said update calendar data being automatically replicated to said phone database.

6. A method according to claim 3, in which said update phone data includes at least one voicemail message, whereby said voicemail message is entered in said calendar database.

7. A method according to claim 6, in which said voicemail message is converted to text format.

8. A method according to claim 6, in which identifying indicia for at least one voicemail message is displayed on a workstation screen, whereby the user may select at least one message to review.

9. A method according to claim 8, in which the user may review said at least one message in audio format.

10. A method according to claim 8, in which the user may review said at least one message in text format.

11. A method according to claim 6, in which said voicemail message is converted to digitized audio format, whereby said voicemail message may be played audibly on a workstation.

12. A method according to claim 5, in which said update calendar data are converted to audio signals, whereby said update calendar data may be played as a voicemail message.

13. An article of manufacture comprising a program storage medium readable by a computer having a memory, the medium tangibly embodying one or more programs of instructions executable by the computer to perform method steps for operating a calendar database in a computer, from which update calendar data are displayed in response to a display request from a user and of operating a phone mail database from which update phone data are played in response to a play request from a user, comprising:
   entering update data in one of said calendar database and phone mail database;
   converting update calendar data into converted phone data and entering said converted phone data into said phone mail database; and
   converting update phone data into converted calendar data and entering said converted calendar data into said calendar database, whereby said calendar database and said phone database contain the same information; and
   providing a user with a set of options including forcing replication of update data to the other of said calendar database and phone mail database and allowing replication of update data according to a schedule.

14. The article of manufacture according to claim 13, in which the user enters update phone data in said phone database from the numeric keypad in a telephone handset, said update phone data being automatically replicated to said calendar database.

15. The article of manufacture of claim 13, in which the user enters update phone data in said phone database by speaking into a telephone handset, said update phone data being automatically replicated to said calendar database.

16. The article of manufacture of claim 13, in which the user enters update calendar data in said calendar database from a workstation, said update calendar data being automatically replicated to said phone database.

17. The article of manufacture of claim 14, in which the user enters update calendar data in said calendar database from a workstation, said update calendar data being automatically replicated to said phone database.

18. The article of manufacture of claim 15, in which said update phone data includes at least one voicemail message, whereby said voicemail message is entered in said calendar database.

19. The article of manufacture of claim 18, in which said voicemail message is converted to text format.

20. The article of manufacture of claim 18, in which identifying indicia for at least one voicemail message is displayed on a workstation screen, whereby the user may select at least one message to review.

21. The article of manufacture of claim 19, in which the user may review said at least one message in audio format.

22. The article of manufacture of claim 19, in which the user may review said at least one message in text format.

23. The article of manufacture of claim 18, in which said voicemail message is converted to digitized audio format, whereby said voicemail message may be played audibly on a workstation.

24. The article of manufacture of claim 17, in which said update calendar data are converted to audio signals, whereby said update calendar data may be played as a voicemail message.

25. A computerized apparatus for operating a calendar database in a computer, from which update calendar data are displayed in response to a display request from a user and for operating a phone mail database from which update phone data are played in response to a play request from a user, comprising:
   at least one computer;
   a phone mail server;
   a calendar server; and
   at least one program, executed by the computer, for entering update data in one of said calendar database and phone mail database;
   for converting update calendar data into converted phone data and entering said converted phone data into said phone mail database;
   for converting update phone data into converted calendar data and entering said converted calendar data into said calendar database, whereby said calendar database and said phone
   database both contain common data, wherein the calendar database is operated by the calendar server and the phone mail database is operated by the phone mail server and the update data is transferred between the calendar server and the phone mail server; and
   for providing a user with a set of options including forcing replication of update data to the other of said calendar database and phone mail database and allowing replication of update data according to a schedule.

26. An apparatus according to claim 25, in which the user enters update phone data in said phone database from the numeric keypad in a telephone handset, said update phone data being automatically replicated to said calendar database.

27. An apparatus according to claim 25, in which the user enters update phone data in said phone database by speaking into a telephone handset, said update phone data being automatically replicated to said calendar database.

28. An apparatus according to claim 25, in which the user enters update calendar data in said calendar database from a workstation, said update calendar data being automatically replicated to said phone database.

29. An apparatus according to claim 26, in which the user enters update calendar data in said calendar database from a workstation, said update calendar data being automatically replicated to said phone database.

30. An apparatus according to claim 27, in which said update phone data includes at least one voicemail message, whereby said voicemail message is entered in said calendar database.

31. An apparatus according to claim 30, in which said voicemail message is converted to text format.

32. An apparatus according to claim 30, in which identifying indicia for at least one voicemail message is displayed on a workstation screen, whereby the user may select at least one message to review.

33. An apparatus according to claim 32, in which the user may review said at least one message in audio format.

34. An apparatus according to claim 32, in which the user may review said at least one message in text format.

35. An apparatus according to claim 30, in which said voicemail message is converted to digitized audio format, whereby said voicemail message may be played audibly on a workstation.

36. An apparatus according to claim 29, in which said update calendar data are converted to audio signals, whereby said update calendar data may be played as a voicemail message.

* * * * *